United States Patent [19]

Harkness et al.

[11] Patent Number: 5,516,871

[45] Date of Patent: May 14, 1996

[54] DIPHENYLSILOXANE OLIGOMERS FUNCTIONALIZED AT BOTH TERMINALS AND METHODS FOR THE PREPARATION THEREOF

[75] Inventors: Brian R. Harkness; Mamoru Tachikawa, both of Kanagawa, Japan

[73] Assignee: Dow Corning Asia, Ltd., Tokyo, Japan

[21] Appl. No.: 407,820

[22] Filed: Mar. 21, 1995

[30] Foreign Application Priority Data

Mar. 23, 1994 [JP] Japan .................................. 6-052010

[51] Int. Cl.⁶ ................................................ C08G 77/08
[52] U.S. Cl. .................... 528/18; 528/14; 528/37; 528/43; 556/450; 556/453; 556/466; 556/469
[58] Field of Search ................... 528/14, 37, 43, 528/18; 556/450, 453, 466, 469

[56] References Cited

U.S. PATENT DOCUMENTS

| | | | |
|---|---|---|---|
| 3,655,713 | 4/1972 | LeGrow | 260/448.2 |
| 3,719,696 | 3/1973 | Jonas | 260/448.2 |
| 4,831,169 | 5/1989 | Grape | 556/451 |
| 5,169,920 | 12/1992 | Okawa | 528/34 |
| 5,319,121 | 6/1994 | Blum | 556/457 |
| 5,399,649 | 3/1995 | Okawa | 528/18 |

FOREIGN PATENT DOCUMENTS 214735  2/1993  Japan .

OTHER PUBLICATIONS

Journal of the Chemical Society of Japan, Industrial Chemistry Section, V62,1421 (1959).

Primary Examiner—Melvyn I. Marquis
Attorney, Agent, or Firm—Alexander Weitz

[57] ABSTRACT

There is disclosed a diphenylsiloxane oligomer functionalized at both terminals and methods for the preparation thereof, said oligomer having the following general formula $$G-(OSiPh_2)_m O-G \qquad (i)$$

wherein Ph denotes a phenyl radical, m is 3 to 50 and G has a formula independently selected from the group consisting of $$R_3Si-(OSi)_k- \begin{matrix} R^4 \\ | \\ | \\ R^5 \end{matrix} \qquad (ii)$$

and $$\begin{matrix} R & R^4 \\ | & | \\ Si-(OSi)_k- \\ | & | \\ Q & R^5 \end{matrix} \qquad (iii)$$

in which R, $R^4$ and $R^5$ are independently selected from the group consisting of methyl, phenyl and $R^1$, $R^1$ is selected from the group consisting of hydrogen and a monovalent hydrocarbon group having 2 to 8 carbon atoms excluding phenyl, tolyl, xylyl, and ethylphenyl radicals, Q is a divalent hydrocarbon group and k is independently 0 to 3 at each terminus of said oligomer with the proviso that k is >0 at one terminus of said oligomer, at least one substituent among R, $R^4$ and $R^5$ in formula (ii) is $R^1$ and, when both $R^4$ and $R^5$ groups at one terminus of said oligomer are phenyl, groups $R^4$ and $R^5$ at the other terminus can not both be phenyl.

14 Claims, 1 Drawing Sheet

DIPHENYLSILOXANE OLIGOMERS FUNCTIONALIZED AT BOTH TERMINALS AND METHODS FOR THE PREPARATION THEREOF

FIELD OF THE INVENTION

This invention relates to diphenylsiloxane oligomers that are capped at both terminals by a siloxane or silyl group in which at least one substituent is hydrogen directly bonded to silicon (SiH) or is a $C_2$ to $C_8$ saturated or unsaturated hydrocarbon group. This invention also relates to methods for the preparation of said diphenylsiloxane oligomers.

BACKGROUND OF THE INVENTION

Within the spectrum of polymeric compounds that comprise diphenylsiloxane units, oligomers are known, in the form of cyclic oligomers, siloxanes stopped at both terminals by the trimethylsilyl group, and siloxanes bearing silanol at both terminals, inter alia. Examples of cyclic oligomers are hexaphenylcyclotrisiloxane, which is the dlphenylsiloxane trimer, and octaphenylcyclotetrasiloxane, which is the tetramer. These are diphenylsiloxane compounds that are fairly soluble in organic solvents and melt between room temperature and 300° C. However, they lack chemical reactivity because they are composed of the chemically stable phenyl group and the similarly stable siloxy bond. In addition, the corresponding solids are in essence organic crystals, and as such their material strength is quite low. In consequence thereof, their exploitation as materials, either alone or in combination with other materials, is unpromising.

With regard to diphenylsiloxane oligomer stopped at both terminals with trimethylsilyl, 1,1,1,9,9,9-hexamethyl-3,3,5,5,7,7-hexaphenylpentasiloxane is known from *Journal of the Chemical Society of Japan, Industrial Chemistry section*, Volume 62, page 1421 (1959). This is also a soluble and fusible diphenylsiloxane. But again, it is composed of the chemically stable phenyl group and the similarly stable trimethylsiloxy group and thus is extremely stable and very inert.

Diphenylsiloxane bearing silanol at both terminals is exemplified by tetraphenyldisiloxane-1,3-diol and hexaphenyltrisiloxane-1,5-diol. These, too, are soluble and fusible diphenylsiloxanes, which again are composed of the chemically stable phenyl group and the similarly stable siloxy bond. Only the silanol group may be classified as a functional group capable of readily participating in bonding. The silanol group is in general able to participate in the formation of composites through the formation of hydrogen bonds with functional groups in another substance or through bond formation by reaction with other hydrolyzable groups. However, when bonded to the diphenyisiloxy group, the silanol group is rather inert. In addition, at high temperatures the silanol group participates in a "backbiting" reaction that is characteristic of polysiloxanes bearing this functional group. Stability then becomes a problem due to the resulting depolymerization reaction, Furthermore, polydiphenylsiloxane homopolymers are also known. These can be prepared by the ring-opening polymerization of hexaphenylcyclotrisiloxane. These homopolymers are brittle white crystalline solids that undergo a phase transition in the vicinity of 260° C. to yield a megophase. This mesophase exhibits poor fluidity, which makes the molding and processing of these homopolymers quite difficult. While these homopolymers could be expected to exhibit satisfactory fluidities at temperatures above their melting points, they melt at 500° C. and above, at which temperatures these polymers have already begun to undergo thermal decomposition. Thus, rather severe problems are associated with the processing of these polymers and the formation of compositions therewith.

The polydimethylsiloxanes are the most typical siloxanes and have various types of derivatives. Many derivatives with the structure given in formula (A) below are known. Oligomers of this class generally remain liquid even at temperatures several tens of degrees Centigrade below the freezing point and thus cannot be hot-melt molded. These polydimethylsiloxane derivatives are prepared by an equilibration reaction between cyclic polydimethylsiloxane oligomer and an end group generally known as an end blocker. However, in the case of diphenylsiloxane, the equilibrium between the cyclic oligomer and straight-chain polymer is strongly skewed toward production of the cyclic oligomer. As a result, diphenylsiloxane oligomer functionalized at both terminals (hereinafter abbreviated as diterminal-functionalized diphenylsiloxane oligomer) essentially cannot be prepared by the analogous preparative method, i.e., using an equilibration reaction.

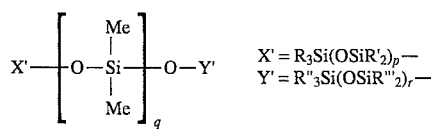

In addition to the preceding, siloxane structures described by the following formula (B) have been widely reported (for example, in lapanese Patent Application Laid Open Number Hei 5-32783). These are siloxane structures that carry various types of functional groups at the two terminals of a diphenylsiloxane-dimethylsiloxane random copolymer.

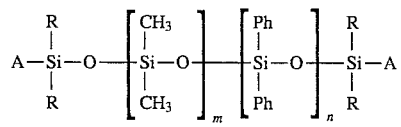

wherein m and n are integers, and A is a functional group bonded to the silicon across a divalent organic group. The main chain in these polymers has a random copolymer structure, which results in these polymers is soluble in solvents and exhibits fluidity when heated. These polymers, therefore, differ in their composition, properties, and preparation from the diterminal-functionalized diphenylsiloxane oligomers introduced and disclosed by the present invention;. In particular, the nature of the contribution of the siloxane fraction to the physical properties of compositions is substantially different for these siloxanes, both when used alone and when used in combination with other materials.

SUMMARY OF THE INVENTION

The present invention takes as its object the introduction of. diphenylsiloxane oligomers stopped at both terminals by siloxane or silyl groups that contain functional groups which are more reactive than the phenyl or methyl group and are able to form intermolecular crosslinks by crosslinking reactions. An additional object of the invention is the introduction of methods for preparing the described diphenylsiloxane oligomers. Examples of subject reactive functional groups are silicon-bonded hydrogen, saturated hydrocarbon groups (e.g., ethyl, propyl, isopropyl, etc.), and unsaturated hydrocarbon groups (vinyl, propenyl, allyl, etc.) in oxidizing ambients, and groups such as vinyl, propenyl, allyl, 4-vinylphenyl, silacyclobutyl, etc., under radical-reaction conditions. The present invention has been disclosed in Japanese Laid Open Patent Application Number Hei 6-52010, the full disclosure of which is hereby incorporated by reference.

BRIEF DESCRIPTION OF THE FIGURE DRAWINGS

FIG. 1 contains a graph that shows the dependence of the phase-transition temperature on the molecular weight for diphenylsiloxane oligomers.

DETAILED DESCRIPTION OF THE INVENTION

Figure 1:
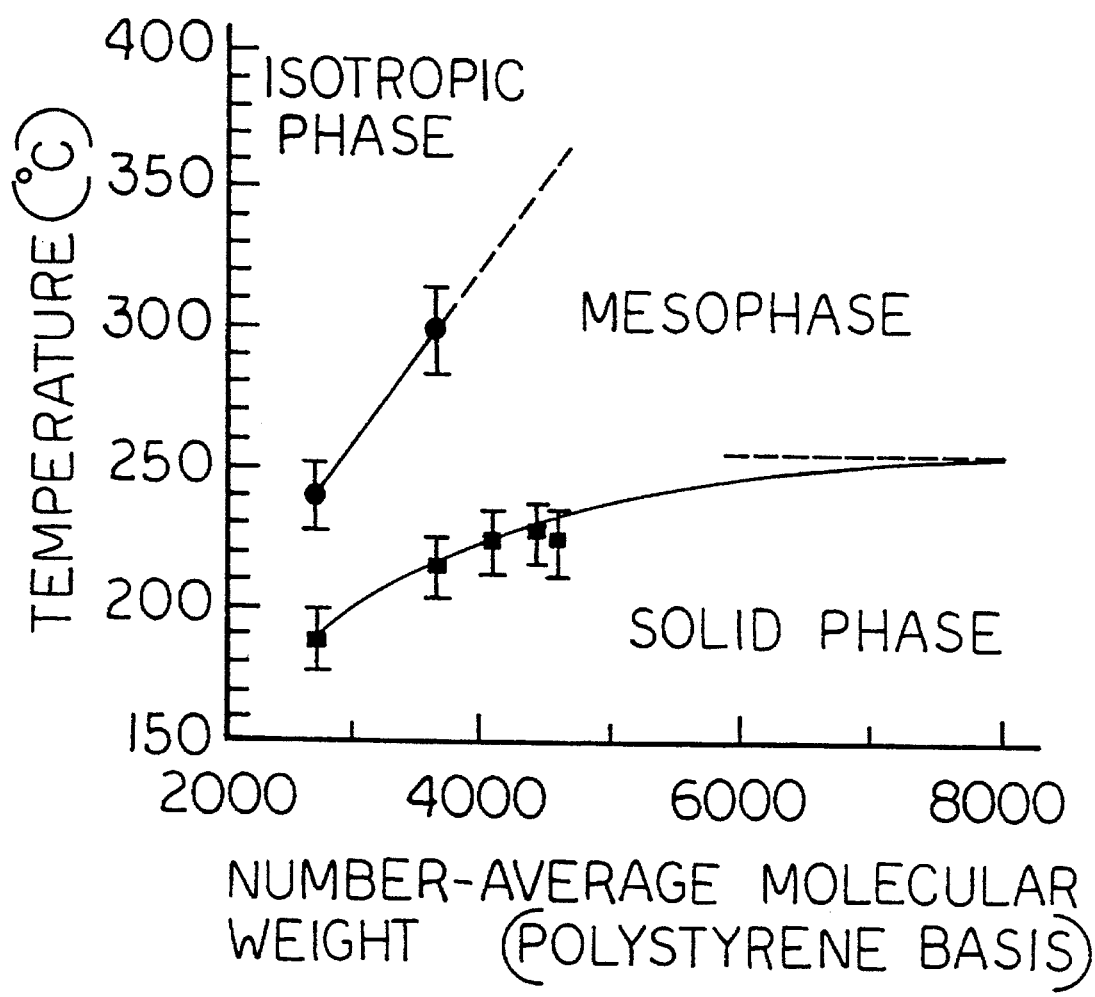

The inventors have found that diphenylsiloxane homopolymers (or oligomer) having degrees of polymerization n up to approximately 50, have a defined relationship between the degree of polymerization (DP) of the polymer (or oligomer) and its melting point, as shown in FIG. 1. In other words, polymer (or oligomer) melting points between room temperature and 400° C. can be obtained through suitable selection of the degree of polymerization n. In addition, the solubility of the polymer and oligomer in organic solvent is specifically related to the degree of polymerization n. While the influence of the end group cannot be neglected, oligomer with n from 3 to 7 is soluble in almost all organic solvents at room temperature. Oligomer with n from 8 to 10 is soluble at room temperature in polar solvents such as tetrahydrofuran, chloroform, and dimethyl sulfoxide, and with moderate heating also in aromatic organic compounds such as benzene and toluene. At DPs from 12 to 15, dissolution requires a solvent such as hot toluene, hot xylene, warm tetrahydrofuran, warm chloroform, or warm N-methylpyrrolidone. At DPs higher than this level, the polymer becomes almost insoluble in ordinary organic solvents. However, up to DPs of approximately 50, the polymer can still be dissolved at temperatures of 150° C. or more in polar high-boiling organic solvents (for example, phenyl ether, ortho-terphenyl, N,N-dimethylformamide). As an example, Table 1 reports the solubility in various organic solvents of diphenylsiloxane oligomer having a degree of polymerization n of approximately 8.

TABLE 1

| | Solubility of diphenylsiloxane oligomer | |
|---|---|---|
| organic solvent | room-temperature solvent (25° C.) | hot solvent |
| tetrahydrofuran | soluble | |
| chloroform | soluble | |
| methylene chloride | soluble | |
| toluene | moderately soluble | soluble |
| dimethyl sulfoxide | insoluble | soluble |
| N,N-dimethylacetamide | insoluble | soluble |
| 1,2-dimethoxyethane | insoluble | soluble |
| n-hexane | | moderately soluble |
| ethyl acetate | | sparingly soluble |
| methyl ethyl ketone | | insoluble |
| acetone | | insoluble |
| methanol | | insoluble |

Notes:
hot solvent: 80° C. or the boiling point of the solvent (acetone, methanol, n-hexane, ethyl acetate).
soluble: denotes dissolution of approximately 10 weight % sample.
diphenylsiloxane of oligomer: the octamer of diphenylsiloxane stopped at both terminals with the vinyldimethylsilyl group.

Based on the preceding information, the inventors conducted research into diterminal-functionalized diphenylsiloxane oligomers with general formula (i) below and as a result were able to achieve the instant invention.

$$G\text{-}(OSiPh_2)_m O\text{-}G \qquad (i)$$

wherein Ph hereinafter denotes a phenyl radical. In formula (i), m represents the average degree of polymerization and is 3 to 50 and G represents terminal groups which are independently selected from the following formulas

or

In formulas (ii) and (iii) R, $R^4$ and $R^5$ are independently selected from the group consisting of methyl, phenyl and $R^1$ wherein $R^1$ is selected from the group consisting of hydrogen and a monovalent hydrocarbon group having 2 to 8 carbon atoms. However, for the purposes of the present invention, $R^1$ can not be phenyl, tolyl, xylyl or ethylphenyl. In formula iii), Q is a divalent hydrocarbon group and k in formulas (ii) and (iii) is independently 0 to 3 at each terminus of the oligomer, with the proviso that k must be greater than zero at one terminus of the oligomer shown in formula (i). For the purposes of the invention, at least one substituent among R, $R^4$ and $R^5$ in formula (ii) must be selected from hydrogen or a monovalent hydrocarbon group having 2 to 8 carbon atoms, excluding phenyl, tolyl, xylyl and ethylphenyl (i.e., $R^1$). Furthermore, when both $R^4$ and $R^5$ groups at one terminus of the oligomer are phenyl, groups $R^4$ and $R^5$ at the other terminus can not both be phenyl.

The first embodiment of the instant invention is a diterminal-functionalized diphenylsiloxane oligomer with the preceding general formula (i).

The second embodiment of the instant invention is a method for the preparation of the diterminal-functionalized diphenylsiloxane oligomers with general formula (i) encompassed by the first ambodiment. This method comprises first running a ring-opening polymerization reaction on cyclic diphenylsiloxane trimer (hexaphenylcyclotrisiloxane) using a lithium silanol ate initiator of the formula $$G\text{-}O^-Li^+ \qquad (iv)$$

wherein G is defined as above. The new lithium silanolate obtained thereby is subjected to an endstopping reaction with a silicon compound having the formula $$G\text{-}X \qquad (v)$$

wherein G is defined as above and X is selected from an acyloxy group, as typified by acetoxy and propionyloxy, or halogen selected from chlorine, bromine or iodine.

As should be clear from the description of the oligomer (i), supra, the substituents R, $R^4$, $R^5$ of group G are selected independently for the initiator (iv) and the endcapping component (v). Again, if both $R^4$ and $R^5$ in the initiator (iv) are phenyl, then $R^4$ and $R^5$ in endstopper (v) can not both be phenyl. Similarly, although k can be 0 to 3 in the initiator and in the endstopper, at least k in the initiator or k in the endstopper (v) must be >0.

The third embodiment of the instant invention is an alternative method for the preparation of the diterminal-functionalized diphenylsiloxane oligomers with general formula (i). This method comprises first running a ring-opening polymerization reaction on the cyclic diphenylsiloxane trimer (hexaphenylcyclotrisiloxane) using the lithium silanolate of formula (iv), as in the second embodiment. The new lithium silanolate obtained thereby is then subjected to a reaction with a cyclic siloxane trimer of the formula $$(R_4R^5SiO)_3 \quad (vi)$$

wherein $R^4$ and $R^5$ are defined as above. The product of this reaction is, in turn, subjected to an endstopping reaction with a silane having a formula selected from $$R_3SiX \quad (vii)$$

or

(viii)

wherein R, Q and X are defined as above.

As noted in connection with the second embodiment, the substituents are selected independently for the initiator (iv), trimer (vi) and silanes (vii) and (viii). Again, if both $R^4$ and $R^5$ in initiator (iv) are phenyl, then $R^4$ and $R^5$ in formula (vi) can not both be phenyl.

The subscript m, which denotes the average degree of polymerization of the diphenylsiloxane oligomer of the present invention, is a number from 3 through 50. The saturated and unsaturated $C_2$ to $C_8$ hydrocarbon groups which are bonded in the terminal silyl or siloxane groups are exemplified by saturated n-alkyl groups, for which typical examples are ethyl, n-propyl, n-butyl, n-pentyl, n-hexyl, n-heptyl, and n-octyl; saturated branched alkyl groups, for which typical examples are isopropyl, sec-butyl, 2-methylpropyl, tert-butyl, isopentyl, sec-hexyl, and 2-ethylhexyl; alkenyl groups such as vinyl, allyl, propenyl, isopropenyl, crotyl, hexenyl, octenyl, and so forth; alkynyl groups, for which typical examples are ethynyl, propynyl, propargyl, butynyl, and phenylethynyl; aryl groups such as 4-vinylphenyl, and ethynylphenyl; aralkyl groups such as benzyl, and phenethyl. In formula (viii), Q is exemplified by trimethylene, tetramethylene or pentamethylene.

The methyl phenyl, tolyl, xylyl, and ethylphenyl groups are hydrocarbon groups that may not be present, either in compounds according to the invention or in starting materials used in the preparative methods, in the capacity of the saturated and unsaturated C, to $C_8$ hydrocarbon substituents specified for the preceding $R^1$ groups.

The following are examples, based on the preceding description, of the endstopping silyl groups that may be present at the two terminals of the diphenylsiloxane oligomers according to the present invention: dimethylhydrogensilyl, methyldihydrogensilyl, trihydrogensilyl, diphenylhydrogensilyl, phenyldihydrogensilyl, methylphenylhydrogensilyl, ethyldimethylsilyl, diethylmethylsilyl, triethylsilyl, ethyldiphenylsilyl, diethylphenylsilyl, ethylmethylphenylsilyl, propyldimethylsilyl, dipropylmethylsilyl, tripropylsilyl, propyldiphenylsilyl, dipropylphenylsilyl, propylmethyphenylsilyl, butyldimethylsilyl, dibutylmethylsilyl, tributylsilyl, butyldiphenylsilyl, dibutylphenylsilyl, butylmethylphenylsilyl, hexyldimethylsilyl, dihexylmethylsilyl, trihexylsilyl, hexyldiphenylsilyl, dihexylphenyhilyl, hexylmethylphenylsilyl, octyldimethylsilyl, diodylmethylsilyl, trioctylsilyl, octyldiphenylsilyl, dioctylphenylsilyl, octylmethylphenylsilyl, vinyldimethylsilyl, divinylmethylsilyl, trivinylsilyl, vinyldiphenylsilyl, isopropyldimethylsilyl, diisopropylmethylsilyl triisopropylsilyl, isopropyldiphenylsilyl, diisopropylphenylsilyl, isopropylmethylphenylsilyl, 2-ethylhexyldimethylsilyl, bis(2-ethylhexyl)methylsilyl, tris(2-ethylhexyl)silyl, 2-ethylhexyldiphenylsilyl, bis(2-ethylhexyl)phenylsilyl, 2-ethylhexylmethylphenylsilyl, divinylphenylsilyl, vinylmethylphenylsilyl, propenyldimethylsilyl, dipropenylmethylsilyl, tripropenylsilyl, propenyldiphenylsilyl, dipropenylphenylsilyl, propenylmethylphenylsilyl, hexenyldimethylsilyl, dihexenylmethylsilyl, trihexenylsilyl, hexenyldiphenylsilyl, dihexenylphenylsilyl, hexenylmethylphenylsilyl, ethynyldimethylsilyl, diethynylmethylsilyl, triethynylsilyl, ethynyldiphenylsilyl, diethynylphenylsilyl, ethynylmethylphenylsilyl, butynyldimethylsilyl, dibutynylmethylsilyl, tributynylsilyl, butynyldiphenylsilyl, dibutynylphenylsilyl, butynylmethylphenylsilyl, (4-vinylphenyl)dimethylsilyl, bis(4-vinylphenyl)methylsilyl, tris(4-vinylphenyl)silyl, (4-vinylphenyl)diphenylsilyl, bis(4-vinylphenyl)phenylsilyl, (4-vinylphenyl)methylphenylsilyl, (ethynylphenyl)dimethylsilyl, di(ethynylphenyl)methylsilyl, tri(ethynylphenyl)silyl, (ethynylphenyl)diphenylsilyl, di(ethynylphenyl)phenylsilyl, (ethynylphenyl)methylphenylsilyl, benzyldimethylsilyl, diethylmethylsilyl, tribenzylsilyl, benzyldiphenylsilyl, dibenzylphenylsilyl, benzylmethylphenylsilyl, butylvinylmethylsilyl, butylethylmethylsilyl, butylethylphenylsilyl, butylvinylphenylsilyl, allylvinylphenylsilyl, allylmethylphenylsilyl, allyldimethylsilyl, diallylmethyisilyl, triallylsilyl, allyldiphenylsilyl, diallylphenylsilyl, allylmethylphenylsilyl, 1-(1-methylsilacyclobutyl), 1-(1-methylsilacyclopentyl), 1-(1-methylsilacyclohexyl), 1-(1-phenylsilacyclobutyl), 1-(1-phenylsilacyclopentyl), 1-(1-phenylsilacyclohexyl), 1-(1-ethylsilacyclobutyl), 1-(1-ethylsilacyclopentyl), 1-(1-ethylsilacyclohexyl), inter alia.

In regard to the nature of endstopping siloxane groups according to the present invention, when at least one substituent of the terminal silyl group in the endstopping siloxane group is the above described $R^1$ group (i.e., hydrogen or a saturated or unsaturated $C_2$ to $C_8$ hydrocarbon group, excluding phenyl, tolyl, xylyl, and ethylphenyl),the remaining substituents in the endstopping siloxane group are selected from methyl, phenyl or $R^1$. However, as noted above, the substituents of endstopping siloxane groups can not all be phenyl. Examples of suitable endstopping siloxane units include —$(CH_3)_2SiO$—, —$(C_2H_5)_2SiO$—, —$(CH_3)(CH_2$=$CH)SiO$—, —$(C_6H_5)(C_2H_5)SiO$—, —$((CH_3)HSiO)$—, —$((C_6H_5)HSiO)$—, intera alia.

The present invention provides melt-moldable diphenylsiloxane oligomers stopped at both terminals by siloxane or silyl groups that possess functional groups that are more reactive than the phenyl or methyl group and are able to form intermolecular crosslinkages by crosslinking reactions. The oligomers are able to generate cured products through melt-crosslinking reaction. The resulting cured products can be used as corrosion-resistant coatings for metals and as insulating materials in electronic components.

EXAMPLES

The invention is explained in greater detail below through working and reference examples, but the invention is not thereby limited. In the product characterization data reported in the examples, $^1$H NMR refers to proton nuclear magnetic resonance spectroscopy, $^{13}$C {1H} NMR refers to proton-decoupled $^{13}$C nuclear magnetic resonance spectroscopy, and $^{29}$Si {1H} NMR refers to proton-decoupled $^{29}$Si nuclear magnetic resonance spectroscopy. CDCl$_3$ refers to deuterochloroform. In the proton nuclear magnetic resonance spectroscopic data, the s, d, t, and m reported in parentheses indicate, respectively, singlet, doublet, triplet, and multiplet. 1H, 2H, 3H, etc., refer, respectively, to a spectral relative intensity corresponding to 1proton, 2 protons, 3 protons, etc. The chemical shifts in the nuclear magnetic resonance spectra are in all cases reported using 0 ppm for tetramethylsilane. GC-MS refers to gas chromatography-mass spectrometric analysis, and GPC refers to gel permeation chromatography. Unless stated otherwise, parts denotes weight parts.

Reference Example 1

Synthesis of initiating lithium-terminated (n-butyldimethyisilanolate

Twenty parts of tetrahydrofuran and 15.8 parts of hexamethylcyclotrisiloxane were placed in a reactor under a nitrogen blanket. Lithium n-butyldimethylsilanolate was then prepared by the addition of 44 parts of a 1.72 mol/L hexane solution of n-butyllithium and stirring for 5 minutes.

Reference Example 2

Synthesis of initiating lithium-terminated (n-butylmethylvinylsilanolate)

Twenty parts of tetrahydrofuran and 18 parts of trimethyltrivinylcyclotrisiloxane were placed in a three-neck flask equipped with addition funnel, water-cooled condenser, and magnetic stirrer. Lithium (n-butylvinylmethylsilanolate) was then prepared by the addition of 47 parts of a 1.72 mol/L hexane solution n-butyllithium and stirring for 30 minutes.

Reference Example 3

Synthesis of initiating lithium-terminated (n-butyldiethysilanolate)

Twenty pads of tetrahydrofuran and 22 parts of hexaethylcyclotrisiloxane were placed in a three-neck flask equipped with addition funnel, water-cooled condenser, and magnetic stirrer. Lithium (n-butyldlethylsilanolate) was then prepared by the addition of 45 parts of a 1.72 mol/L hexane solution of n-butyllithium and stirring for 30 minutes.

Reference Example 4

Synthesis of (4-vinylphenyl)dimethylchlorosilane
(4-Vinylphenyl)magneslum chloride was
synthesized by the gradual dropwise addition of 50
pads of p-chlorostyrene to a mixture of 15 parts of
magnesium turnings and 100 parts of
tetrahydrofuran. This was gradually added dropwise
over 2 hours to 50 parts of dimethyldichlorosilane
dissolved in 100 parts of tetrahydrofuran, after
which the reaction was heated for an additional 2
hours under reflux. The reaction solution was
cooled and then filtered and the solvent was
distilled off. Distillation of the residual liquid at 1
mmHg yielded 50 parts
(4-vinylphenyl)dimethylchlorosilane.

(4-vinylphenyl)dimethylchlorosilane:

$^1$H-NMR (CDCl$_3$, CHCl$_3$=7.24 (s, 6H), 5.35 (dd, 1H), 5.86 (dd, 1H), 6.76 (dd, 1H), 7.48 (m, 2H), 7.63 (m, 2H).

$^{13}$C {1H}-NMR (CDCl$_3$, CDCl$_3$, =77): 2.00, 115.03, 125,75, 133.28, 135.52, 136.43, 139.35.

$^{29}$Si {1H}-NMR (CDCl$_3$); 20,24.

Example 1

Synthesis of oligo(diphenylsiloxane) stopped at one terminal by the butyldimethylsilyl group and at the other terminal by the dimethylsilyl group Twelve parts of hexaphenyltrisiloxane and 12 parts of diphenyl ether were heated to 160° C. under argon. The lithium silanolate prepared in Reference Example 1 was then added in an amount that provided a silanolate: diphenylsiloxane group ratio of 1:17, and a reaction was run for 40 minutes. This was followed by the addition of 3 equivalents of dimethylchlorosilane and heating for 10 minutes. After the reaction solution had been cooled to room temperature, a white precipitate was produced by the addition of 200 parts of methanol. This precipitate was washed with 200 parts of acetone and dried to obtain 8.9 parts of the butyldimethylsilyl-stopped/dimethylsilyl-stopped oligo(diphenylsiloxane) as a white solid.

Analytic results:

GPC analysis (polystyrene basis): number-average molecular weight=3,600, dispersity (weight-average molecular weight/number-average molecular weight)=1.14.

infrared spectrum: Si—H 2127 cm$^{-1.}$ proton NMR (ppm): −0.1 to +1.4, 4.9, 6.8 to 7.7.

Example 2

Synthesis of oligo(diphenylsiloxane) stopped at one terminal by the butylvinylmethylsilyl group and at the other terminal by the dimethylvinylsilyl group Fifteen parts of hexaphenyltrisiloxane and 15 parts of diphenyl ether were heated to 160° C. under argon. The lithium silanolate prepared in Reference Example 2 was then added in an amount that provided a silanolate: diphenylsiloxane group ratio of 1:14, and a reaction was run for 35 minutes. This was followed by the addition of 3 equivalents of dimethylvinylchlorosilane and heating for 10 minutes. After the reaction solution had been cooled to room temperature, a white precipitate was produced by the addition of 200 parts of methanol. This precipitate was washed with 200 parts of acetone and dried to obtain 12 parts of the butylvinylmethylsilyl-stopped/dimethylvinylsilyl-stopped oligo-(diphenylsiloxane) as a white solid.

Analytic results:

GPC analysis (polystyrene basis): number-average molecular weight=3,200, dispersity (weight-average molecular weight/number-average molecular weight)=1.26.

proton NMR (ppm): −0.02 to +1.4, 5.5 to 6,0, 6.7 to 7.5.

Example 3

Synthesis of oligo(diphenylsiloxane) stopped at one terminal by the butylvinylmethylylsilyl group and at the other terminal by the dimethylvinylsilyl group In this example, oligomer with a molecular weight smaller than the product in Example 2 was synthesized by the same procedure as used in Example 2. Specifically, 12 parts of hexaphenyltrisiloxane and 12 parts of o-xylene were heated at reflux under argon. The lithium silanolate prepared in Reference Example 2 was then added in an amount that provided a silanolate: diphenylsiloxane group ratio of 1:7, and a reaction was run for 90 minutes. The reaction was then terminated by the addition of 2 parts of dimethylvinylchlorosilane. After the reaction solution had been cooled to room temperature, a white precipitate was produced by the addition of 200 parts of methanol. This precipitate was washed with 200 parts of acetone and dried to obtain 6.3 parts of the butylvlnylmethylsilyl-stopped/dimethylvinylsilyl-stopped oligo(diphenylsiloxane) as a white solid.

Analytic results:

GPC analysis (polystyrene basis): number-average molecular weight=1,900, dispersity (weight-average molecular weight/number-average molecular weight)=1.14.

Example 4

Synthesis of oligo(diphenylsiloxane) stopped at one terminal by the butylvinylmethylsilyl group and at the other terminal by the (4-vinylphenyl)dimethylsilyl group Ten parts of hexaphenyltrisiloxane and 11 parts of o-xylene were heated at reflux under argon. The lithium silanolate prepared in Reference Example 2 was then added in an amount that provided a silanolate: diphenylsiloxane group ratio of 1:7, and a reaction was run for 90 minutes. The temperature of the reaction solution was then lowered to 60° C. 2.5 parts of 4-vinylphenyldimethylchlorosilane (preparation o described in Reference Example 4) was added and heating was carried out for 60 minutes. After the reaction solution had been cooled to room temperature, a white precipitate was produced by the addition of 200 parts of methanol. This precipitate was washed with 200 pads of acetone and dried to obtain 5 parts of the butylvinylmethylsilyl-stopped/(4-vinylphenyl)dimethylsilyl-stopped oligo-(diphenylsiloxane) as a white solid.

Analytic, results:

GPC analysis (polystyrene basis): number-average molecular weight=1,700, dispersity (weight-average molecular weight/number-average molecular weight)=1.11.

Infrared absorption due to the silanol group was not observed, which confirmed complete silylation.

Example 5

Synthesis of oligo(diphenylsiloxane stopped at one terminal by the butyldiethylsilyl group and at the other terminal by the triethylsilyl group Fifteen parts of hexaphenyltrisiloxane and 19 parts of diphenyl ether were heated to 160° C. under argon. The lithium silanolate prepared in Reference Example 3 was then added in an amount that provided a silanolate: diphenylsiloxane group ratio of 1:14, and a reaction was run for 35 minutes. Two parts of triethylchlorosilane was added and heating was carried out for 10 minutes. After the reaction solution had been cooled to room temperature, a white precipitate was produced by the addition of 200 parts of methanol. This precipitate was washed with 200 parts acetone and dried to obtain 11.7 pads of the butyldiethylsilyl-stopped/triethylsilyl-stopped oligo(diphenylsiloxane) as a white solid.

Analytic results:

GPC analysis (polystyrene basis): number-average molecular weight=3,000, dispersity (weight-average molecular weight/number-average molecular weight)=1.27.

Infrared absorption due to the silanol group was not observed, which confirmed complete silylation.

Example 6

Synthesis of oligo,(diphenylsiloxane) stopped at one terminal by the butyldiethylsilyl group and at the other terminal by the tripropylsilyl group Fifteen pads of hexaphenyltrisiloxane and 19 pads of diphenyl ether were heated to 160° C. under argon. The lithium silanolate prepared in Reference Example 3 was then added in an amount that provided a silanolate: diphenylsiloxane group ratio of 1:18, and a reaction was run for 35 minutes. Two parts of tripropylchlorosilane was added and heating was carried out for 10 minutes. After the reaction solution had been cooled to room temperature, 200 parts of methanol was added. The resulting precipitate was washed with 200 parts acetone and dried to obtain 12.9 pads of the butyldiethylsilyl-stopped/tripropylsilyl-stopped oligo-(diphenylsiloxane) as a white solid.

Analytic results:

GPC analysis (polystyrene basis): number-average molecular weight=3,000, dispersity (weight-average molecular weight/number-average molecular weight)=1.25.

Infrared absorption due to the silanol group was not observed, which confirmed complete silylation.

That which is claimed is:

1. A diphenylsiloxane oligomer functionalized at both terminals, said oligomer having the following general formula

G-(OSiPh$_2$)$_m$O-G    (i)

wherein Ph denotes a phenyl radical, m is 3 to 50 and G has a formula independently selected from the group consisting of

and

in which R, R$^4$ and R$^5$ are independently selected from the group consisting of methyl, phenyl and R$^1$, R$^1$ is selected from the group consisting of hydrogen and a monovalent hydrocarbon group having 2 to 8 carbon atoms excluding phenyl, tolyl, xylyl, and ethylphenyl radicals, Q is a divalent hydrocarbon group and k is independently 0 to 3 at each terminus of said oligomer with the proviso that k is >0 at one terminus of said oligomer, at least one substituent among R, R$^4$ and R$^5$ in formula (ii) is R$^1$ and, when both R4 and R$^5$ groups at one terminus of said oligomer are phenyl, groups R$^4$ and R$^5$ at the other terminus can not both be phenyl.

2. The diphenylsiloxane oligomer according to claim 1, wherein the silyl group R$_3$Si— of formula (ii) is selected from the group consisting of dimethylhydrogensilyl, methyldihydrogensilyl, trihydrogensilyl, diphenylhydrogensilyl, phenyldihydrogensilyl and methylphenylhydrogensilyl.

3. The diphenylsiloxane oligomer according to claim 1, wherein the silyl group $R_3Si—$ of formula (ii) is selected from the group consisting of ethyldimethylsilyl, diethylmethylsilyl, triethylsilyl, ethyldiphenylsilyl, diethylphenylsilyl, ethylmethylphenylsilyl, propyldimethylsilyl, dipropylmethylsilyl, tripropylsilyl, propyldiphenylsilyl, dipropylphenylsilyl, propylmethylphenylsilyl, butyldimethylsilyl, dibutylmethylsilyl, tributylsilyl, butyldiphenylsilyl, dibutylphenylsilyl, butylmethylphenylsilyl, hexyldimethylsilyl, dihexylmethylsilyl, trihexylsilyl, hexyldiphenylsilyl, dihexylphenylsilyl, hexylmethylphenylsilyl, octyldimethylsilyl, dioctylmethylsilyl, trioctylsilyl, octyldiphenylsilyl, dioctylphenylsilyl and octylmethylphenylsilyl.

4. The diphenylsiloxane oligomer according to claim 1, wherein the silyl group $R_3Si—$ of formula (ii) is selected from the group consisting of vinyldimethylsilyl, divinylmethylsilyl, trivinyisilyl, divinylphenylsilyl, vinylmethylphenylsilyl, vinyldiphenylsilyl, butylvinylmethylsilyl, butylvinylmethylsilyl, allylvinylphenylsilyl, allylmethylphenylsilyl, allyldimethylsilyl, diallylmethylsilyl, triallylsilyl, allyldiphenylsilyl, diallyiphenylsilyl and allylmethylphenylsilyl.

5. The diphenylsiloxane oligomer according to claim 1, wherein the silyl group $R_3Si—$ of formula (ii) is selected from the group consisting of isopropyldimethylsilyl, diisopropylmethylsilyl, triisopropylsilyl, isopropyldiphenylsilyl, diisopropylphenylsilyl, isopropylmethylphenylsilyl, 2-ethylhexyldimethylsilyl, bis(2-ethylhexyi)methylsilyl, tris(2-ethylhexyl)silyl, 2-ethylhexyldiphenylsilyl, bis(2-ethylhexyl)phenylsilyl and 2-ethylhexylmethyiphenylsilyl.

6. The diphenylsiloxane oligomer according to claim 1, wherein the silyl group $R_3Si—$ of formula (ii) is selected from the group consisting of propenyldimethylsilyl, dipropenylmethylsilyl, tripropenylsilyl, propenyldiphenylsilyl, dipropenylphenylsilyl, propenylmethylphenylsilyl, butylethyimethylsilyl, butylethylphenylsilyl, hexenyldimethylsilyl, dihexenylmethylsilyl, trihexenylsilyl, hexenyldiphenylsilyl, dihexenylphenylsilyl and hexenylmethylphenylsilyl.

7. The diphenylsiloxane oligomer according to claim 1, wherein the silyl group $R_3Si—$ of formula (ii) is selected from the group consisting of ethynyldimethylsilyl, diethynylmethylsilyl, triethynylsilyl, ethynyldiphenylsilyl, diethynylphenylsilyl, ethynylmethylphenylsilyl, butynyldimethylsilyl, dibutynylmethylsilyl, tributynylsilyl, butynyldiphenylsilyl, dibutynylphenylsilyl and butynylmethylphenylsilyl.

8. The diphenylsiloxane oligomer according to claim 1, wherein the silyl group $R_3Si—$ of formula (ii) is selected from the group consisting of (4-vinylphenyl)dimethylsilyl, bis(4-vinylphenyl)methylsilyl, tris(4-vinylphenyl)silyl, (4-vinylphenyl)diphenylsilyl, bis(4-vinylphenyl)phenylsilyl and (4-vinylphenyl)methylphenylsilyl.

9. The diphenylsiloxane oligomer according to claim 1, wherein the silyl group $R_3Si—$ of formula (ii) is selected from the group consisting of (ethynylphenyl)dimethylsilyl, di(ethynylphenyl)methylsilyl, tri(ethynylphenyl)silyl, (ethynylphenyl)diphenylsilyl, di(ethynylphenyl)phenylsilyl and (ethynylphenyl)methylphenylsilyl.

10. The diphenylsiloxane oligomer according to claim 1, wherein the silyl group $R_3Si—$ of formula (ii) is selected from the group consisting of benzyldimethylsilyl, dibenzylmethylsilyl, tribenzylsilyl, benzyldiphenylsilyl, dibenzylphenylsilyl and benzylmethylphenylsilyl.

11. The diphenylsiloxane oligomer according to claim 1, wherein the silyl group

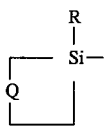

of formula (iii) is selected from the group consisting of 1-(1-methylsilacyclobutyl), 1-(1-methylsilacyclopentyl), 1-(1-methylsilacyclohexyl), 1-(1-phenylsilacyclobutyl), 1-(1-phenylsilacyclopentyl), 1-(1-phenylsilacyclohexyl), 1-(1-ethylsilacyclobutyl), 1-(1-ethylsilacyclopentyl) and 1-(1-ethylsilacyclohexyl).

12. The diphenylsiloxane oligomer according to claim 1, wherein $R^4$ and $R^5$ are independently selected from the group consisting of methyl, ethyl and vinyl radicals.

13. A method for the preparation of a diphenylsiloxane oligomer having the following general formula $$G\text{-}(OSiPh_2)_m O\text{-}G \quad \text{(i)}$$

wherein Ph denotes a phenyl radical, m is 3 to 50 and G has a formula independently selected from the group consisting of

and

in which R, $R^4$ and $R^5$ are independently selected from the group consisting of methyl, phenyl and $R^1$, $R^1$ is selected from the group consisting of hydrogen and a monovalent hydrocarbon group having 2 to 8 carbon atoms excluding phenyl, tolyl, xylyl, and ethylphenyl radicals, Q is a divalent hydrocarbon group and k is independently 0 to 3 at each terminus of said oligomer with the proviso that k is >0 at one terminus of said oligomer, at least one substituent among R, $R^4$ and $R^5$ in formula (ii) is $R^1$ and, when both $R^4$ and $R^5$ groups at one terminus of said oligomer are phenyl, groups $R^4$ and $R^5$ at the other terminus can not both be phenyl, said method comprising:

(I) polymerizing hexaphenylcyclotrisiloxane using a lithium silanolate initiator of the formula $$G\text{-}O^-Li^+ \quad \text{(iv)};$$

and (II) reacting the product of step (I) with a silicon compound having the formula $$G\text{-}X \quad \text{(v)}$$

wherein G has its formula independently selected from said formula (ii) or said formula (iii) and X is selected from acyloxy, chlorine, bromine or iodine.

14. A method for the preparation of a diphenylsiloxane oligomer having the following general formula $$G\text{-}(OSiPh_2)_m O\text{-}G \quad \text{(i)}$$

wherein Ph denotes a phenyl radical, m is 3 to 50 and G has a formula independently selected from the group consisting of

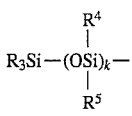 (ii)

and

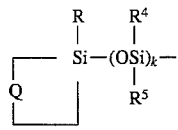 (iii)

in which R, $R^4$ and $R^5$ are independently selected from the group consisting of methyl, phenyl and $R^1$, $R^1$ is selected from the group consisting of hydrogen and a monovalent hydrocarbon group having 2 to 8 carbon atoms excluding phenyl, tolyl, xylyl, and ethylphenyl radicals, Q is a divalent hydrocarbon group and k is independently 0 to 3 at each terminus of said oligomer with the proviso that k is >0 at one terminus of said oligomer, at least one substituent among R, $R^4$ and $R^5$ in formula (ii) is $R^1$ and, when both $R^4$ and $R^5$ groups at one terminus of said oligomer are phenyl, groups $R^4$ and $R^5$ at the other terminus can not both be phenyl, said method comprising:

(I) polymerizing hexaphenylcyclotrisiloxane using a lithium silanolate initiator of the formula

 (iv);

(II) reacting the product from step (I) with a cyclic siloxane trimer of the formula

 (vi)

wherein $R^4$ and $R^5$ are defined as above; and (III) reacting the product from step (II) with a silane having a formula selected from

 (vii)

or

 (viii)

wherein R and Q are defined as above and X is selected from acyloxy, chlorine, bromine or iodine.

* * * * *